(12) United States Patent
Padmanaban et al.

(10) Patent No.: US 8,627,431 B2
(45) Date of Patent: Jan. 7, 2014

(54) DISTRIBUTED NETWORK NAME

(75) Inventors: Sai Sudhir Anantha Padmanaban, Redmond, WA (US); Alan M. Warwick, Bellevue, WA (US); Andrea D'Amato, Kirkland, WA (US); Henry Anthuvan Aloysius, Sammamish, WA (US); Vladimir Petter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 13/153,399

(22) Filed: Jun. 4, 2011

(65) Prior Publication Data

US 2012/0311685 A1    Dec. 6, 2012

(51) Int. Cl.
*H04L 9/32*    (2006.01)

(52) U.S. Cl.
USPC .................................................. 726/7; 726/9

(58) Field of Classification Search
None
See application file for complete search history.

(56) References Cited

U.S. PATENT DOCUMENTS

| | | | |
|---|---|---|---|
| 5,394,555 A | 2/1995 | Hunter et al. | |
| 6,119,143 A | 9/2000 | Dias et al. | |
| 6,748,416 B2 | 6/2004 | Carpenter et al. | |
| 6,801,949 B1 | 10/2004 | Bruck et al. | |
| 6,865,597 B1 | 3/2005 | Bandopadhyay et al. | |
| 6,954,881 B1 | 10/2005 | Flynn, Jr. et al. | |
| 7,496,565 B2 | 2/2009 | Thind et al. | |
| 7,506,009 B2 | 3/2009 | Singh et al. | |
| 7,525,902 B2 | 4/2009 | Dominic | |
| 7,885,930 B2 | 2/2011 | Anzai et al. | |
| 2005/0283658 A1 | 12/2005 | Clark et al. | |
| 2007/0226359 A1* | 9/2007 | Gunduc et al. | 709/229 |
| 2008/0005196 A1 | 1/2008 | Beck | |
| 2008/0256607 A1 | 10/2008 | Janedittakarn et al. | |
| 2009/0132552 A1 | 5/2009 | Adya et al. | |
| 2009/0204705 A1 | 8/2009 | Marinov et al. | |
| 2009/0327798 A1 | 12/2009 | D'Amato et al. | |
| 2011/0296486 A1* | 12/2011 | Burch et al. | 726/1 |

OTHER PUBLICATIONS

Sadtler, Carla, "WebSphere Application Server V6.1: Technical Overview", Retrieved at <<http://www.redbooks.ibm.com/redpapers/pdfs/redp4191.pdf>>, Retrieved Date: Mar. 17, 2011, pp. 1-68.

"Using Microsoft Server Technology to Build Carrier Grade Call Centers", Jun. 2004, pp. 15.

Wang, et al., "Xenloop: A Transparent High Performance Inter-Vm Network Loopback", Retrieved at: http://osnet.cs.binghamton.edu/publications/wang08xenloop.pdf, Proceedings of the 17th international symposium on High performance distributed computing, vol. 12, Issue 02, Jun. 23-27, 2008, pp. 10.

(Continued)

*Primary Examiner* — Brandon Hoffman
*Assistant Examiner* — Nega Woldemariam
(74) *Attorney, Agent, or Firm* — Rau Patents, LLC

(57) ABSTRACT

Aspects of the subject matter described herein relate to a distributed network name. In aspects, computers of a cluster have components of a distributed network name service. The network name service has a leader and clones that are hosted on the computers of the cluster. The leader is responsible for updating a name server with network names and addresses of the computers. The leader is also responsible for configuring a security server that allows clients to securely access the computers. The network name service provides credentials to local security authorities of the computers so that a client that attempts to access a service of the computers can be authenticated.

19 Claims, 7 Drawing Sheets

(56) References Cited

OTHER PUBLICATIONS

Ekren, Steven, et al., "Innovating High Availability with Cluster Shared Volumes", 2009, pp. 44.

"Failover Clustering Performance Counters—Part 1", Sep. 4, 2009, pp. 4.

Schulman, Jerold, "The Microsoft Windows Cluster Service (MSCS) Clustering Model", Apr. 7, 2003, pp. 2.

"Cluster Shared Volumes (CSV): Disk Ownership", Mar. 1, 2009, pp. 4.

"Pomegranate—Storing Billions and Billions of Tiny Little Files", Retrieved at <<http://highscalability.com/blog/2010/8/30/pomegranate-storing-billions-and-billions-of-tiny-little-fil.html>>, Aug. 30, 2010, pp. 14.

"The Oracle Database Lite RDBMS", Retrieved at <<http://download.oracle.com/docs/cd/B19188_01/doc/B15920/nvdb.htm>>, Retrieved Date: Mar. 28, 2011, pp. 18.

"HDFS Architecture", Retrieved at <<http://hadoop.apache.org/common/docs/r0.20.2/hdfs_design.html>>, Retrieved Date: Mar. 28, 2011, pp. 7.

\* cited by examiner

DISTRIBUTED NETWORK NAME

CROSS REFERENCE TO RELATED APPLICATIONS

This application is related to U.S. patent application Ser. No. 13/153,416 entitled "CLUSTERED FILE SERVICE."

BACKGROUND

A cluster may include one or more machines. Clusters are often used to increase performance and availability. When a single server computer serves client computers, updating name servers and security mechanisms such that the client computers can find and use services of the server computer and be authenticated is relatively straightforward. Doing these same things in a cluster, however, is challenging.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to a distributed network name. In aspects, computers of a cluster have components of a distributed network name service. The network name service has a leader and clones that are hosted on the computers of the cluster. The leader is responsible for updating a name server with network names and addresses of the computers. The leader is also responsible for configuring a security server that allows clients to securely access the computers. The network name service provides credentials to local security authorities of the computers so that a client that attempts to access a service of the computers can be authenticated.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
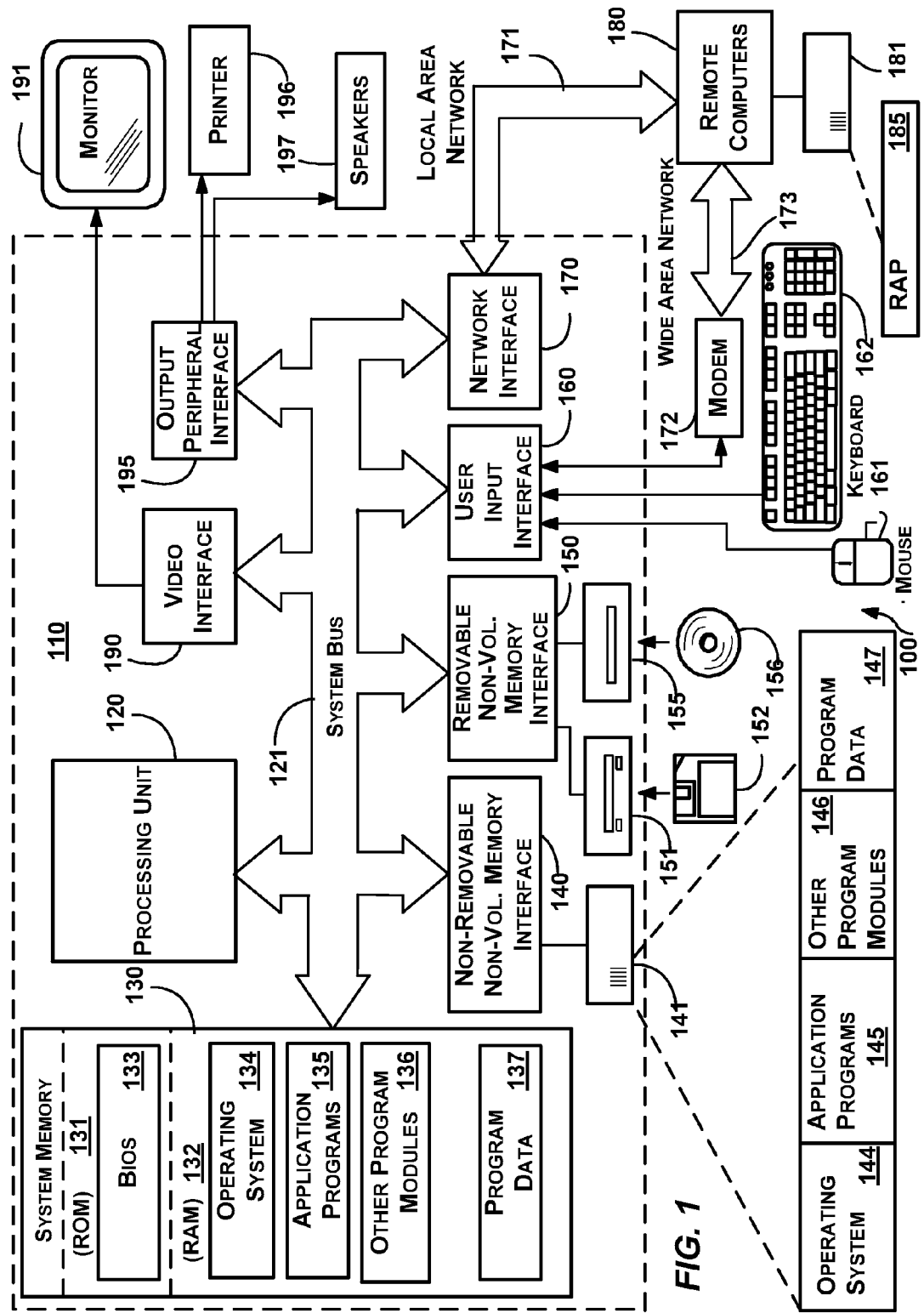
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Network Name

Figure 2:
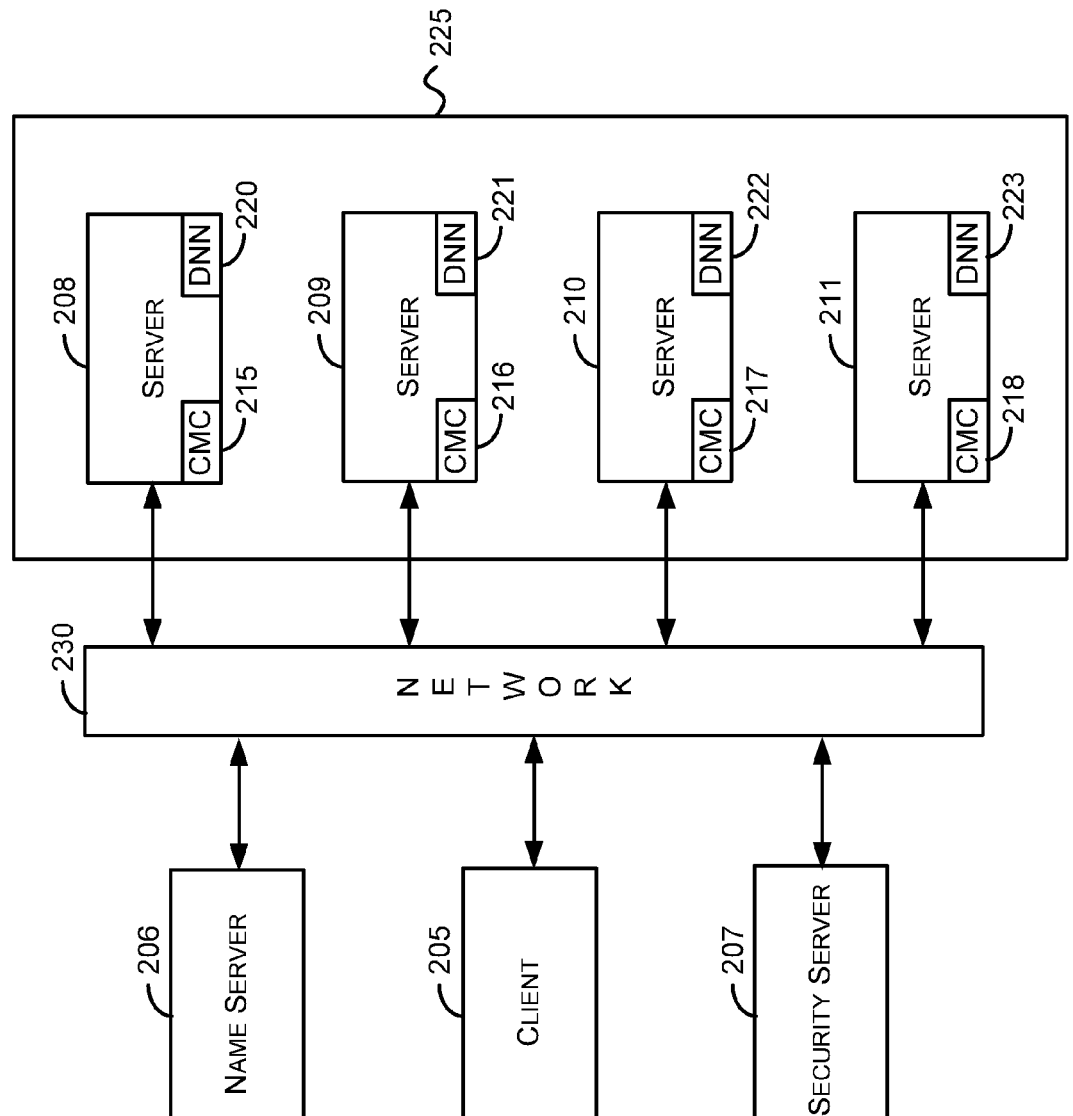
FIG. 2 is a block diagram that represents an exemplary environment in which aspects of the subject matter described herein may be implemented.

As mentioned previously, finding and using services and authenticating clients in a cluster is challenging. FIG. 2 is a block diagram that represents an exemplary environment in which aspects of the subject matter described herein may be implemented. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein.

As used herein, the term component is to be read to include hardware such as all or a portion of a device, a collection of one or more software modules or portions thereof, some combination of one or more software modules or portions thereof and one or more devices or portions thereof, and the like.

Turning to FIG. 2, the environment may include a client 205, a name server 206, a security server 207, a cluster 225, a network 230, and may include other entities (not shown). The cluster 210 may include one or more computers 208-211 (sometimes referred to as servers or nodes). The computers 208-211 may host cluster management components 215-218 (sometimes referred to as a cluster manager) and distributed network name (DNN) components 220-223. One of the DNN components 220-223 may be designated as the leader while the other DNN components may be designated as clones. The function of the leader and the clones will be described in more detail below.

Although the cluster illustrated in FIG. 2 has DNN components on each of the computers 208-211, in other embodiments, not all of the computers may have DNN components. In other words, a portion of the computers of a cluster may host DNN components without departing from the spirit or scope of aspects of the subject matter described herein. In addition, there may be multiple DNN services hosted on the same cluster. Furthermore, a cluster may be partitioned into two or more portions where each portion hosts a DNN service for a subset of the cluster. The portions may overlap.

The various entities (e.g., the client 205, the name server 206, the security server 207, and the servers 208-211) may be located relatively close to each other or may be distributed across the world. The computers 208-211 of the cluster 225 may, for example, be on the same local area network or may be located in different locations and communicate with each other via one or more networks including the network 230. The various entities may communicate with each other via various networks including intra- and inter-office networks. The client 205 (sometimes referred to herein as a requestor) may communicate with servers of the cluster 225 via the network 230.

In an embodiment, the network 230 may comprise the Internet. In an embodiment, the network 230 may comprise one or more local area networks, wide area networks, direct connections, virtual connections, private networks, virtual private networks, some combination of the above, and the like.

The client 205, the name server 206, the security server 207, and the computer 208-211 of the cluster 225 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

The name server 206 may include data that identifies network addresses of various entities including the computer 208-211. In one embodiment, the data may associate a network name with network addresses of the computers 208-211. In one embodiment, the name server 206 may comprise a Domain Name System (DNS) server. The name server 206 may be hosted by a computer of the cluster 225 or may be hosted by another computer.

When the client 205 seeks to access a server, the client 205 may contact the name server 206 and provide a name. In response, the name server may look up network addresses associated with the name. If more than one network address is associated with the name, the name server may alternate in sending one of the network addresses (e.g., via round robin or some other algorithm), may send a list of the network addresses where the list is ordered such that using the first address of the list will distribute requests to alternate servers, or may act in some other way to provide one or more network addresses to the client 205.

The client 205 may also access the security server 207 in preparation for authenticating with one of the servers 208-211. In one embodiment, the security server 207 may implement a Kerberos algorithm in which tokens are provided to clients. A token may include security data that allows the client to access one or more of the computers 208-211. In one embodiment, the security server 207 may comprise a server configured with ACTIVE DIRECTORY® (AD). The security server 207 may be may hosted by a computer of the cluster 225 or may be hosted by another computer.

Although Kerberos and ACTIVE DIRECTORY® are mentioned above, there is no intention to limit aspects of the subject matter described herein to only those implementations. Indeed, based on the teachings herein, those skilled in the art may recognize many other security mechanisms that may be used without departing from the spirit or scope of aspects of the subject matter described herein.

For example, in one embodiment, a security module on each node may be relied on to provide security services. This module may be the node's default security mechanism. Security data may be replicated (e.g., via a distributed security component) between computers of the cluster 225 to ensure that each computer has the data needed for authentication. If security data regarding a user changes on one of the nodes, the distributed security component may update each of the nodes with the updated security data. In this embodiment, the security server 207 may comprise the distributed security component and the default security modules of each node.

After the client 205 has obtained the security data from the security server 207, the client 205 may connect to one of the computers of the cluster 225 and may present the security data to authenticate itself and may in turn authenticate the server to which the client 205 connected. After authentication, the client may access a server (e.g., a file server) hosted on the computer to which the client connected.

As mentioned previously, the computers 208-211 may host cluster management components 215-218 and distributed network name components 220-223. The cluster management components 215-218 may provide a framework for managing and communicating with the computers 208-211 with respect to cluster activities. For example, the cluster management components 215-218 may monitor health of the computers and servers hosted thereon and may indicate when a computer has joined or left the cluster. The cluster management components 215-218 may provide a mechanism by which servers of the computers 208-211 may discover and communicate with each other. The cluster management components 215-218 may also call entry points of the distributed network name components 215-218 as described in more detail below.

Figure 3:
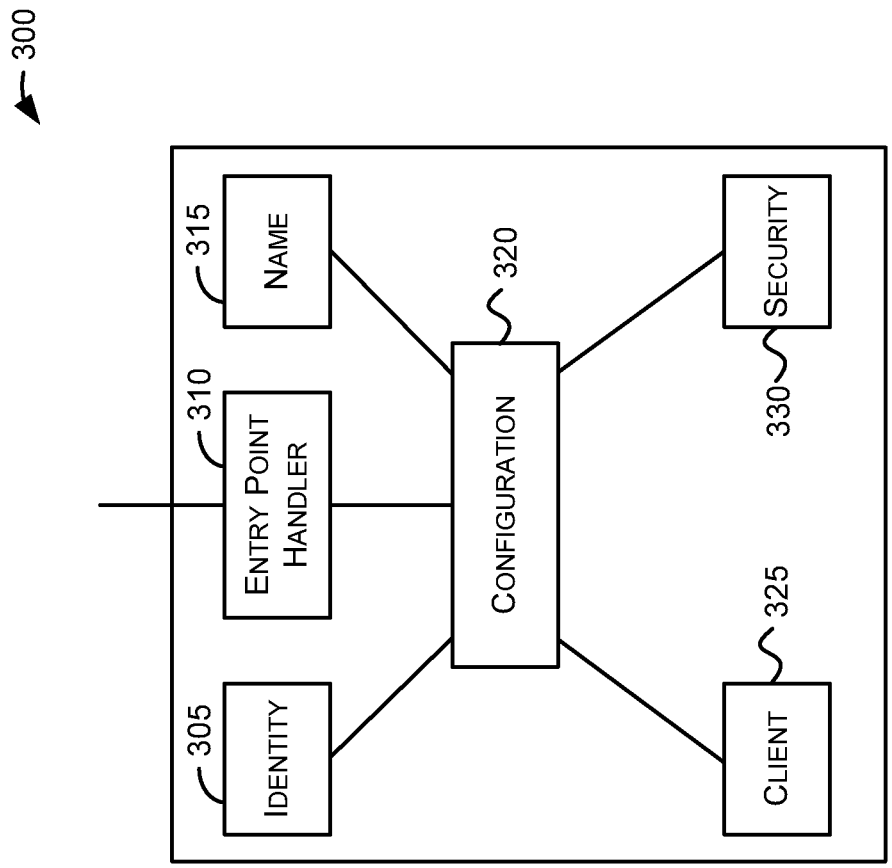
FIG. 3 is a block diagram that represents exemplary components that may be hosted on each of the computers 208-211 of FIG. 2 in accordance with aspects of the subject matter described herein.

FIG. 3 is a block diagram that represents exemplary components that may be hosted on each of the computers 208-211 of FIG. 2 in accordance with aspects of the subject matter described herein. The components 300 correspond to the distributed network name (DNN) components that reside on each of the computers 208-211.

The components 300 may include an identity component 305, an entry point handler 310, a name component 315, a configuration component 320, a client component 325, a security component 330, and other components (not shown). Some or all of the components may be active on a leader of the DNN service while some of the components may not be active on a clone of the DNN service. The term DNN service is used to refer to the DNN components that reside on one or more computers of the cluster to perform distributed network name actions as described herein.

The entry point handler 310 allows an external entity, such as a component of the cluster management components, to perform management operations with respect to the components 300. The entry point handler 310 may receive a message from the cluster manager and may take actions in response thereto. Some exemplary management operations include instantiating, deleting, activating, deactivating, indicating that a node is to act as a leader or clone, communicating with, configuring, and the like. For example, a cluster management component may call entry points including:

1. Open( ). This may be called, for example, when a resource is created, when a node is added to the DNN service, when reattaching a monitoring process, and the like. In response, a node of the DNN service that receives the open request may instantiate all of its components (e.g., the identity component 305, the name component 315, the client component 325, and the security component 330. The node may wait to activate one or more of those components until later. In addition, when a node receives the open request, if the DNN configuration data already exists, the node may start supplying access tokens to applications that have requested such tokens. These applications may then use the tokens to impersonate the DNN service to access resources outside of the DNN service.

2. Online( ). This entry point is called on a node that is to become the DNN leader. In response to receiving this entry point, a node may activate its configuration, name, and security components. If the online entry point is received to create a brand new DNN (e.g., with no persisted properties), the DNN leader may activate the identity component on the nodes of the DNN service by sending a broadcast message (e.g., via a broadcast component not shown). In response, a clone component may retrieve credentials (e.g., domain name, user name, password, or the like) from a common store such as a cluster database. A client component on a node that receives the broadcast message may wait to activate itself until instructed by another component (e.g., a file server component) executing on the node.

In one embodiment, instead of having the clones obtain the credentials from a common store, the leader may securely communicate the credentials directly to each of the clones. When credentials change, the leader may securely communicate the changed credentials to the clones.

3. Offline( ). This entry point is called on a node to cause it to relinquish DNN leadership. In response, the node deactivates its configuration, name, and security components. If the call includes a flag that indicates that the offline of the DNN service is persistent, the DNN leader may broadcast to all nodes to deactivate identity and client components. If the call does not include a flag that indicates that the offline of the DNN service is persistent, the identity and client components of each node of the DNN service remain functional.

4. Terminate( ). This entry point may be called for various reasons including, for example, if a health monitor indicates problems, to kill the cluster hosting subsystem, to cause the DNN service to fail via an API, or for other reasons. The terminate call may include a flag that lets the DNN know if the cluster hosting subsystem plans to bring the DNN service online on another node. In response to receiving a terminate call, if the flag is not set, a broadcast message is sent to all clones to deactivate the identity and client components. If the flag is sent, the client and identity components are still active on all nodes.

5. Close( ). This entry point may be called for various reasons including, for example, if a DNN resource is being deleted. In response to a close call, all components on the node are deactivated and deleted.

6. IsAlive/LooksAlive( ). This entry point may be called by the cluster hosting subsystem for the DNN leader only. In response to receiving this call, the DNN leader may check if the appropriate object exists on the security server and has not been corrupted.

7. ResourceCtl( ). This entry point may be called for resource controls. It may also be called for interaction with a distributed file server that uses the DNN service for the name and authentication services.

8. Some other entry point not described above. The list above is not intended to be all-inclusive or exhaustive of all entry points that may be called. Based on the teachings herein, those skilled in the art may recognize other entry points that may also be used without departing from the spirit or scope of aspects of the subject matter described herein.

The configuration component 320 maintains configuration data of the DNN service while the DNN service is online and may store the configuration data in a persistent store. Configuration information may include, for example, IP addresses of the nodes involved in the DNN service, status of and other data (e.g., last update time, name server name, time to live, and the like) associated with a name server, status of and other data (e.g., object identifier, password expiration date, and the like) associated with a security server, data about a domain controller associated with the DNN service, and the like.

The security component 330 includes functionality for interacting with a security server. Such functionality may include, for example, functionality to set object attributes, change passwords or other credentials, and the like. If the computer is a leader, the security component may communicate with a security server (e.g., such as the security server 207) to indicate credentials by which the distributed network name service is accessible via the one or more computers of the cluster that are hosting the network name service.

The name component 315 includes functionality for interacting with a name server. Such functionality may include, for example, functionality to update name information on the name server. The name component 315 may configure the name server to associated network addresses (e.g., of the DNN service computers) with a network name (e.g., of the DNN service). In configuring the name server, the name component 315 may instruct the name server (implicitly or explicitly) to provide at least one of the network addresses to an entity that provides the network name to the name server.

In addition as nodes are added or removed from the cluster, the name component 315 may update the name server. For example, the name component 315 may add a network address if another computer begins hosting the distributed name server and may remove a network address if one of the computers that is currently hosting the distributed name service stops hosting the distributed name service.

Furthermore, the name component 315 may further operate to periodically refresh the network addresses on the name server even if there have been no additions to or subtractions from the one or more computers of the cluster that are hosting the distributed name service.

The identity component 305 may allow impersonation of the DNN service for use in communicating with other entities. For example, the identity component 305 may obtain and provide a token that allows an entity to impersonate the DNN service when accessing a resource external to the DNN service. A resource external to the DNN service is a resource that is not controlled by the DNN service.

As mentioned previously, one server of a DNN service may be configured as a leader while the other servers of the DNN service may be configured as clones. A DNN leader may be responsible for actions including:

1. Updating the name server. When the DNN leader is instantiated and at other times, the DNN leader may check to see what clones are part of the DNN service. If the DNN leader finds clones, the DNN leader may add the clones' network addresses (e.g., IP addresses) to an address list and update a name server (e.g., the name server 206 of FIG. 2) as appropriate. Each time a new clone is added or a current clone is removed from the DNN service, the DNN leader may update its address list and update the name server as appropriate. The DNN leader may provide multiple addresses (e.g., IPv4, IPv6, tunnel addresses, and the like) to the name server for each clone.

2. Update the security server. The DNN leader may also update the security server. For example, periodically or at other times, the DNN leader may update the credentials that the security server uses to create the token it provides to clients.

3. Communicating with the clones. The DNN leader may interact with a DNN clone at various points including, for example:

A. When a DNN clone start up. This may occur because a node is added to the cluster, a cluster service starts on a node, a monitoring process is attached via the resource hosting subsystem, or the like. At this point the DNN clone may send a GetLeaderState to the DNN leader.

B. When the DNN leader persistently put online or offline. At this point, the DNN leader may send a SendLeaderState to the clones.

C. When credentials are changed. In this case the DNN leader may provide the new credentials to the DNN clones via a SendCredentialsUpdate.

The GetLeaderState may be processed asynchronously by the DNN leader. The clone may pass an input buffer of the clone's node identifier. In response, the DNN leader may, for example, fork off a thread and send a reply to the clone using the SendLeaderState message.

The SendLeaderState message is sent from the DNN leader to the DNN clone either after a persistent offline/online or in response to a GetLeaderState message. The SendLeaderState message includes a flag that indicates the current leader state (e.g., Offline/Online), a flag indicating if a file server is dependent on the DNN service, and potentially other data. When a clone receives this message, the clone may do nothing if the DNN leader is offline; otherwise, the DNN clone may add a transport in an enabled or disabled state. The transport may be used for accessing a distributed file server, for example.

The SendCredentialsUpdate message is sent from the DNN leader to the DNN clones. When a clone receives a SendCredentialsUpdate message, the client component may update a local security authority that maintains information about local security of a computer that hosts the clone. This local security authority may use the credentials supplied by the clone to authenticate clients that seek to access a service of the computer. For example, if a client is accessing a distributed file system server, the local security authority may authenticate the client prior to allowing access to the file system server hosted on the computer that hosts the clone.

The DNN leader may send an indication that credentials are available to the clones so that each clone (or another application associated with the clone) is able to obtain the credentials and authenticate a client. If the credentials change, the DNN leader may send a message to the clones so indicating. When a new clone is added, the clone may obtain the credentials from a common store of the DNN service.

Figure 4:
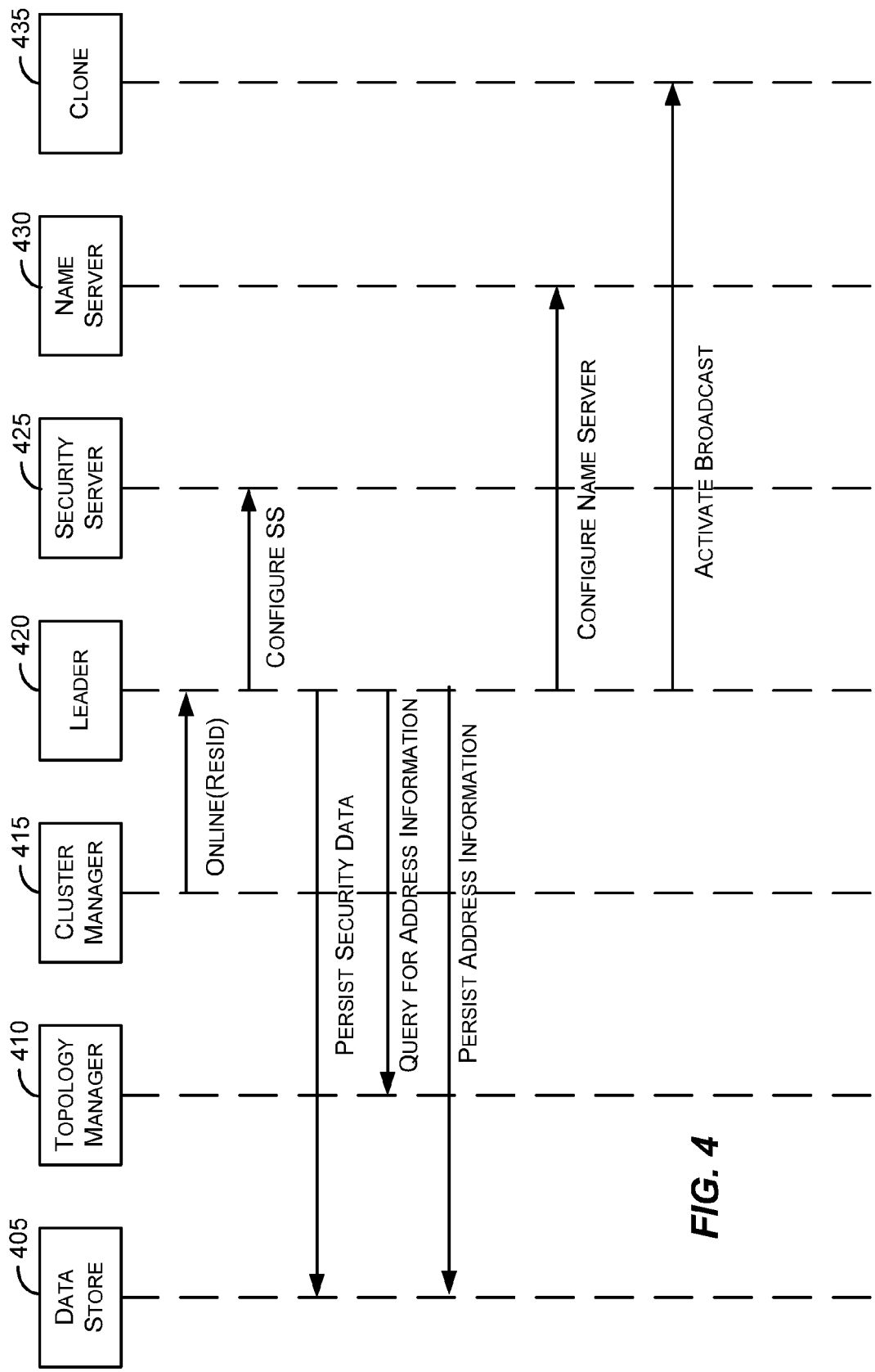
FIG. 4 is a timing diagram that illustrates an exemplary sequence of actions in accordance with aspects of the subject matter described herein.

FIG. 4 is a timing diagram that illustrates an exemplary sequence of actions in accordance with aspects of the subject matter described herein. The ordering of the sequence of events is not intended to be the only possible ordering or a complete listing of all the events that may happen. In other embodiments, events may be re-ordered or happen in parallel and other events not shown may occur.

To start a leader of a DNN service, the cluster manager 415 sends a message (e.g., Online(Resource Identifier)) to the leader 420. In response, the leader 420 instantiates its components and activates them. Then the leader 420 configures the security server 425 so that the security server 425 has the appropriate security data to provide tokens to clients.

After configuring the security server 425, the leader 420 may persist the security data on the data store 405. After persisting the security data, the leader 420 may query for address information from the topology manager 410. In response, the topology manager 410 may provide network addresses of nodes within the cluster that are to host the DNN service.

After receiving the address information, the leader 420 may persist the address information in the data store 405. The leader may configure the name server 430 with the address information so that clients are able to reach applications that depend on the DNN service. After configuring the name server 430, the leader may send a broadcast message to the clone(s) 435 instructing the clones to activate their client and identity components. Each client component may update a local security authority with credentials that may be used to authenticate clients.

Figure 5:
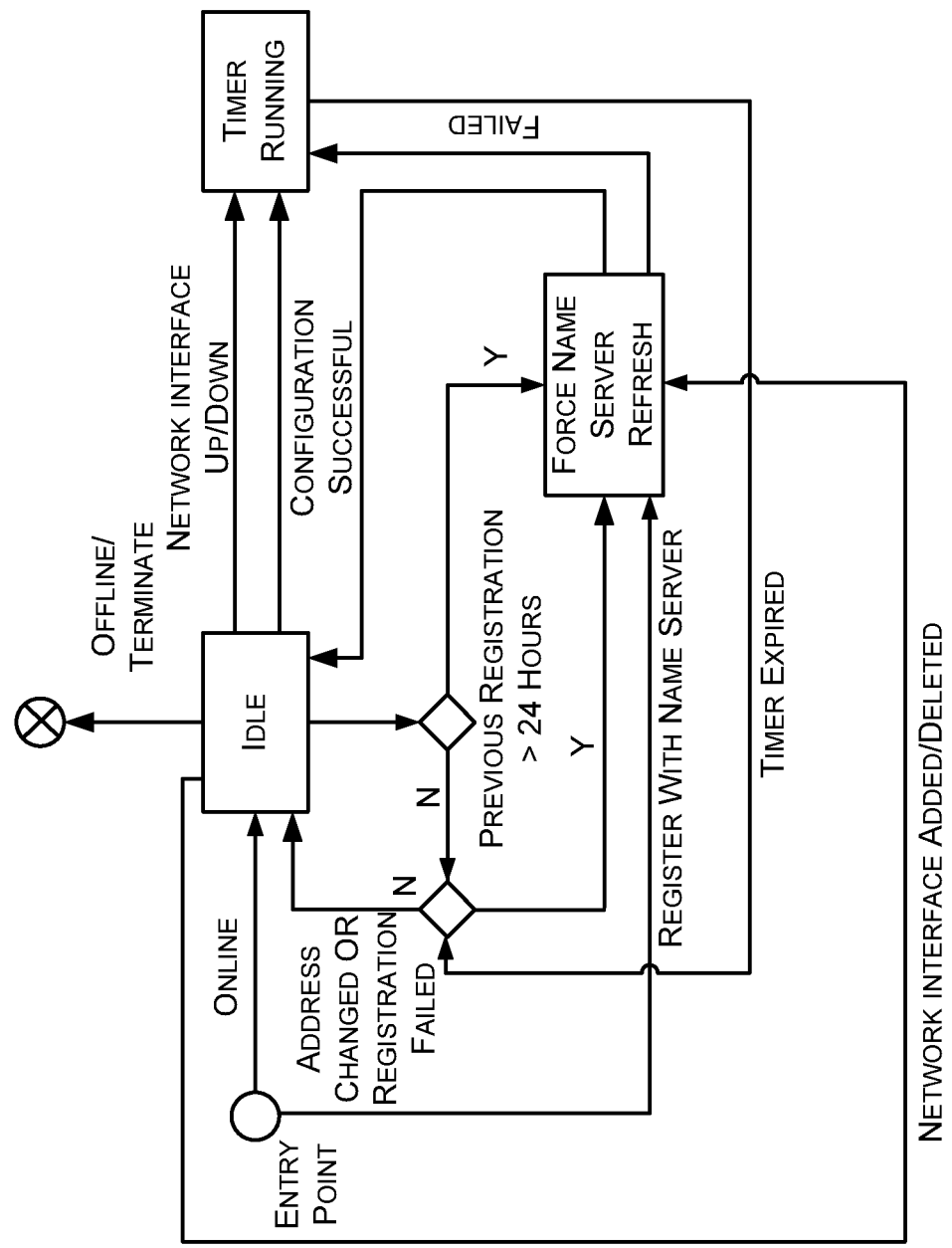
FIG. 5 is a state diagram that illustrates exemplary states in accordance with aspects of the subject matter described hereon.

FIG. 5 is a state diagram that illustrates exemplary states in accordance with aspects of the subject matter described hereon. The states and transitions illustrated in FIG. 5 are not intended to be all-inclusive or exhaustive. In other embodiments, there may be more, fewer, or other states and transitions.

Turning to FIG. 5, from an entry point, the state proceeds to the idle state or to the force name server refresh state.

From the idle state, the state transitions to the timer running state if a network interface goes up or down or if a network address is added or removed. If from the idle state, a certain amount of time (e.g., 24 hours) has elapsed since the name server has been configured, the state transitions to the forced name server refresh state. The state may also transition to this state if the address has changed or a registration has failed. The state may also transition from the idle state to the force name server refresh state if a network interface has been added or deleted from any of the servers that are part of the DNN service.

From the forced name server refresh state, the state may transition to the time running state if the refresh failed. The state may transition to the idle state if the configuration of the name server is successful.

From the timer running state, the state may transition to the idle state or to the force name server refresh state depending on if the address changed or the registration failed.

Figure 6:
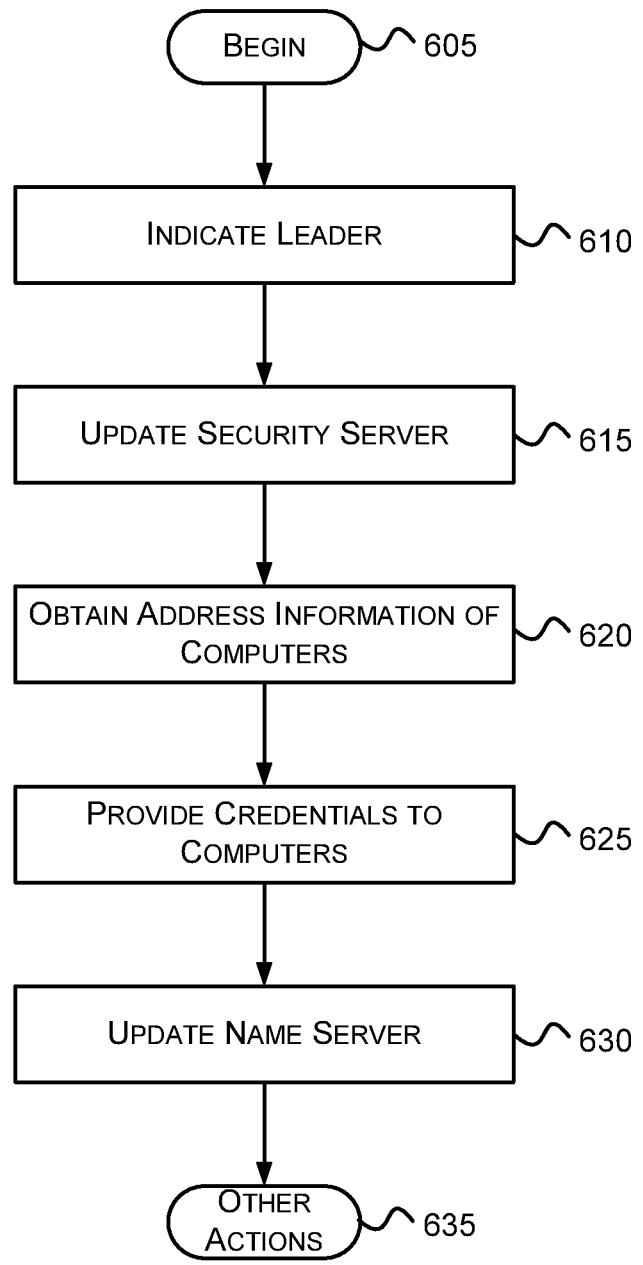
FIGS. 6-7 are flow diagrams that generally represent exemplary actions that may occur in accordance with aspects of the subject matter described herein.
Figure 7:
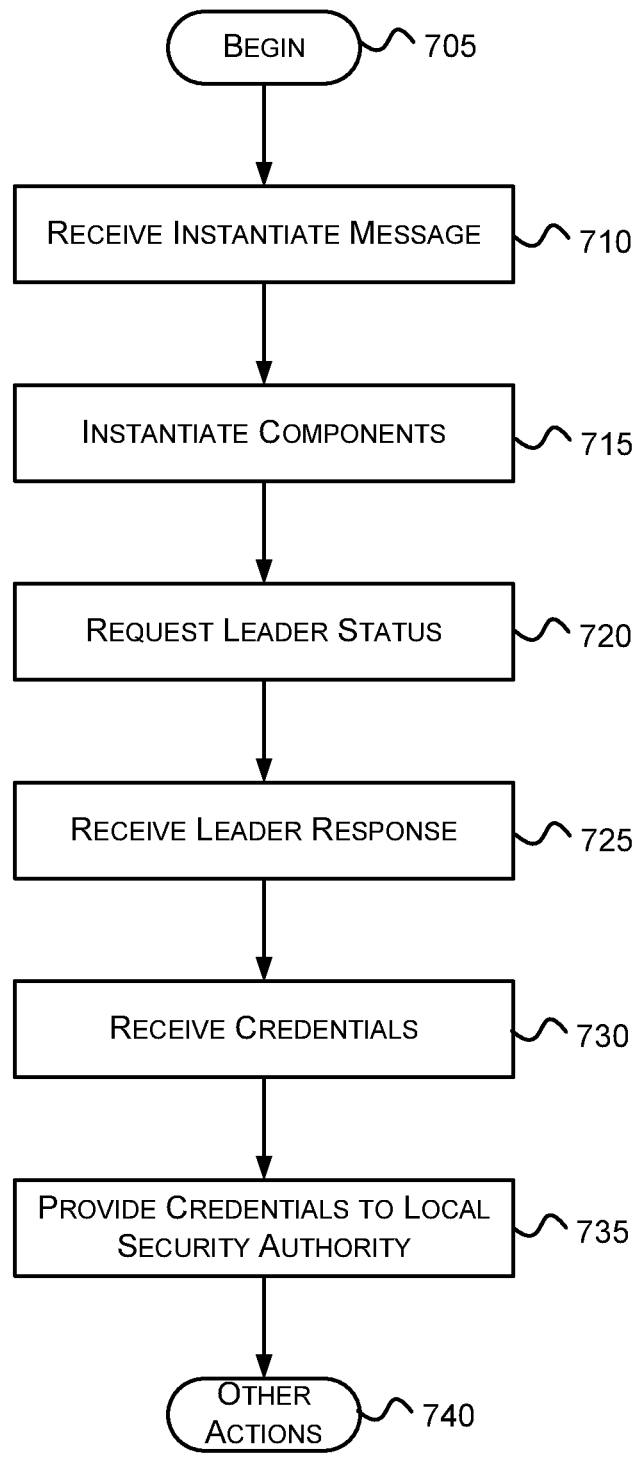

FIGS. 6-7 are flow diagrams that generally represent exemplary actions that may occur in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited to the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 605, the actions begin. At block 610, a leader is indicated. For example, referring to FIG. 3, a cluster manager may indicate that a node is the leader by calling the online entry point of the entry point handler 310.

At block 615, a security server is updated with security information associated with the computers in the cluster that host the name service. For example, referring to FIGS. 2 and 3, the security component 330 may set object attributes, change password or other credentials, or provide other data to the security server 207. The security server 207 may use this information to provide tokens to the clients. These tokens may allow the clients access to a service hosted on the computers of the cluster 225. One exemplary service includes a file server that provides access to files via each of the computers of the cluster 225.

At block 620, address information is obtained for the computers in the cluster that are to be referenced by a network name. For example, referring to FIG. 4, the leader 420 may obtain IP addresses of computers in the cluster by querying the topology manager 410. As another example, the leader 420 may obtain the IP addresses by querying the data store 405 for previously stored IP addresses of computers in the cluster.

At block 625, credentials are provided from the leader to the computers for use in authenticating clients that seek access the computers of the cluster. For example, referring to FIG. 4, the leader 420 may store credentials in a store of the cluster and send a broadcast to the clones that credentials are available. Credentials may include, for example, a user name and password. The user name and password may be usable to authenticate clients that seek to access a service hosted on the computers.

At block 630, the name server is updated with address information of the computers. For example, referring to FIG. 4, the leader 420 may configure the name server 430 to associate a network name with network addresses of the computers of the cluster. When a client provides the name to the name server 430, the name server 430 may respond with one or more of the network addresses.

At block 635, other actions, if any, may be performed. For example, the leader may receive information that indicates that a computer has been added to the computers in the cluster and may in response update the name server with a network address of the newly added computer. As another example, the leader may receive information that indicates that a computer has been removed from the computers in the cluster and may in response update the name server to remove a network address of the removed computer.

As another example, the leader may update the security server with new security information and send another broadcast that informs the computers in the cluster that new credentials are available for use in authenticating clients that seek access a service hosted on the computers.

Turning to FIG. 7, at block 705, the actions begin. At block 710, a message is received to instantiate the components of a clone. This message is received at the entry point handler of the clone. For example, referring to FIG. 3, the entry point hander 310 receives an Open( ) call.

At block 715, in response to the message, the components of the clone may be instantiated. For example, referring to FIG. 3, in response to the Open( ) call, the components of the clone may be instantiated.

At block 720, a request is sent to a leader of the name service. The request includes an identifier of the clone and requests a state of the leader. For example, referring to FIG. 2, a clone (e.g., the clone hosted on the computer 209) may send a request to the leader (e.g., the leader hosted on the computer 208) and may provide an identifier of the clone (e.g., something that may be used to identify the computer 209 to the cluster management components).

At block 725, a message may be received from the leader that indicates if the leader is online or offline. For example, referring to FIG. 2, a clone (e.g., the clone hosted on the computer 209), may receive a message from the leader (e.g., the leader hosted on the computer 208) that indicates whether the leader is online or offline.

At block 730, if the leader is online, credentials may be obtained. For example, referring to FIG. 2, the clone (e.g., the clone hosted on the computer 209), may receive a message from the leader (e.g., the leader hosted on the computer 208) that indicates that credentials are available. In response, the clone may retrieve credentials from a store of the cluster.

At block 735, the clone may provide the credentials to a local security authority operable to use the credentials to authenticate clients that seek to access a service of the computer. For example, referring to FIG. 3, client 325 may update a local security authority that maintains information about local security of a computer that hosts the clone. This local security authority may use the credentials supplied by the clone to authenticate clients that seek to access a service of the computer.

At block 740, other actions, if any, may be performed. For example, a clone may receive a message that the name service has been terminated and may in response revoke the credentials from the local authority, deactivate any of the components that are active, and delete the components.

As another example, the clone may receive a message that the clone is to become the leader of the name service. In response, the clone may activate all of its components that have not already been activated and may assume the role of the leader.

As can be seen from the foregoing detailed description, aspects have been described related to a distributed network name. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   at a leader of a name service hosted on a cluster, obtaining address information for computers in the cluster for referencing the computers by a network name;
   updating a name server with the address information of the computers by configuring the name server via the leader with network addresses of the computers and associating the network addresses with the network name;
   updating a security server with security information associated with the computers; and
   providing credentials to the computers for use in authenticating clients that seek access to the computers of the cluster.

2. The method of claim 1, wherein obtaining the address information comprises querying a topology manager for a list of network addresses of the computers.

3. The method of claim 1, wherein obtaining the address information comprises querying a data store for a previously stored list of network addresses of the computers.

4. The method of claim 1, wherein updating a security server with security information associated with the computers comprises configuring the security server via the leader with security data usable to provide a token that allows access to a service hosted on the computers.

5. The method of claim 1, wherein providing credentials to the computers comprises broadcasting a message to the computers that indicates that a user name and password are available from a store, the user name and password usable to authenticate clients that seek to access a service hosted on the computers.

6. The method of claim 1, further comprising receiving information that indicates that a computer has been added to the computers and in response updating the name server with a network address of the computer.

7. The method of claim 1, further comprising receiving information that indicates that a computer has been removed from the computers and in response updating the name server to remove a network address of the computer.

8. The method of claim 1, further comprising updating the security server with new security information and providing a message from the leader to the computers that new credentials are available, the new credentials for use in authenticating clients that seek access a service hosted on the computers.

9. In a computing environment, a system, comprising:
   a configuration component operable to maintain configuration data of a distributed name service that is hosted by one or more computers of a cluster;
   an entry point handler operable to receive messages from a cluster manager of the cluster including at least a message that indicates whether a computer is to act as a leader of the distributed name service;
   a name component operable, if the computer is to act as the leader, to interact with a name server to indicate one or more network addresses of the one or more computers;
   a security component operable, if the computer is to act as the leader, to interact with a security server to indicate credentials by which the distributed name service is accessible via the one or more computers.

10. The system of claim 9, further comprising a client component operable to provide the credentials to a local security authority that maintains information about local security of a hosting computer that hosts the client component, the local security authority operable to use the credentials to authenticate clients that seek to access a service of the hosting computer.

11. The system of claim 9, further comprising an identity component operable to impersonate the distributed name service in accessing a resource external to the system.

12. The system of claim 9, wherein the entry point handler is further operable in response to receiving an open message to instantiate components of the distributed name service that are hosted on a computer that hosts the entry point handler.

13. The system of claim 9, further comprising a broadcast component operable, if the computer is to act as the leader, to send a message to the one or more computers that host the distributed name service, the message indicating that the credentials are available for use by the one or more computers.

14. The system of claim 9, wherein the name component being operable to interact with a name server to indicate one or more network addresses of the one or more computers comprises the name component being operable to configure the name server to associate the one or more network addresses with a network name, the name server being instructed to provide at least one of the network addresses to an entity the provides the network name to the name server.

15. The system of claim 9, wherein the name component being operable to interact with a name server to indicate one or more network addresses of the one or more computers comprises the name component being operable to configure the name server to add an additional network address if another computer begins hosting the distributed name service and to remove a network address if one of the computers stops hosting the distributed name service.

16. The system of claim 9, wherein the name component being operable to interact with the name server to indicate one or more network addresses of the one or more computers comprises the name component periodically refreshing the one or more network addresses on the name server even if there have been no additions to or subtractions from the one or more computers of the cluster that are hosting the distributed name service.

17. A computer readable storage device having computer-executable instructions, which when executed perform actions, comprising:
   at an entry point handler of clone of a name service hosted on a cluster, receiving a message to instantiate components of the clone;
   in response to the message, instantiating the components;
   sending a request to a leader of the name service, the request including an identifier of the clone, the request requesting a state of the leader;
   receiving from the leader a message that indicates if the leader is online; and
   if the leader is online, obtaining credentials and providing the credentials to a local security authority, the local security authority operable to use the credentials to authenticate clients that seek to access a service of the computer.

18. The computer readable storage device of claim 17, further comprising at the entry point handler of the clone, receiving a message that the name service is terminated and in response deactivating any of the components that are active and deleting the components.

19. The computer readable storage device of claim 17, further comprising at the entry point handler of the clone, receiving a message that the clone is to become the leader of the name service and in response activating all of the components that have not already been activated.

* * * * *